United States Patent [19]

Falkowitz

[11] 3,860,550
[45] Jan. 14, 1975

[54] PRIMER COATING COMPOSITION
[75] Inventor: Abe I. Falkowitz, Philadelphia, Pa.
[73] Assignee: The United States of America as represented by the Secretary of the Navy, Washington, D.C.
[22] Filed: May 26, 1971
[21] Appl. No.: 147,190

[52] U.S. Cl. ........ 260/33.6 UA, 117/75, 117/132 C, 260/42.44, 260/42.52, 260/901
[51] Int. Cl. ............................................ C08f 45/28
[58] Field of Search ..................... 260/33.6 UA, 901

[56] References Cited
UNITED STATES PATENTS
2,940,950  6/1960  Gusman ............................. 260/901

OTHER PUBLICATIONS
Riddle, E. H., Monomeric Acrylic Esters, Reinhold Pub. Corp., 1954, New York, pages 58–64 and 72–73.
Payne, Henry Fleming, Organic Coating Technology, Vol. II, John Wiley and Sons, Inc., New York, pages 791–793 and 834–835, TP 935P38C.2

*Primary Examiner*—James H. Derrington
*Attorney, Agent, or Firm*—R. S. Sciascia; Henry Hansen; Arthur A. McGill

[57] ABSTRACT

Subject disclosure relates to a novel and improved one package primer coating composition which readily adheres to the metal surface to be protected and to the subsequently applied acrylic lacquer topcoat. The ingredients of the improved one package primer composition include strontium or zinc chromate, a magnesium silicous extender, a methyl methacrylate ethyl acrylate copolymer, a methyl methacrylate methyl acrylate copolymer and the solvent, toluene.

5 Claims, No Drawings

PRIMER COATING COMPOSITION

Various two package epoxy paint formulations have been generally used in the past to provide a primer type of protective coating on aluminum and cadmium plated steel surfaces. Although these two package formulations normally exhibit satisfactory properties and characteristics after they have been properly applied, they are generally cumbersome in their use and application. More specifically, a two package primer must be freshly mixed for each application and due to its short pot life, portions left over are wasted and discarded. Moreover, use of the two package primer in aerosol cans is difficult and expensive.

It is therefore a principal object of the invention to provide a novel and improved one package primer coating composition which readily adheres to and protects the surface to be protected.

It is a further object of the invention to provide a novel and improved one package primer coating composition which is particularly useful in touch up type painting operations.

It is a further object of the invention to provide a novel and improved single package, fast air drying, corrosion inhibitive primer which affords good adhesion to the metal surface to be protected and to its acrylic lacquer topcoat.

Other objects and many of the attendant advantages of this invention will be readily appreciated as the same becomes better understood by reference to the following detailed description when considered in connection with the accompanying description.

These and other objects of the invention are accomplished by preparing a unique one package primer coating composition which includes the following ingredients in the following proportions by weight:

| INGREDIENT | PARTS BY WEIGHT |
|---|---|
| A pigment material | 300 |
| An extender material | 300 |
| A first acrylic resin | 1050 |
| A second acrylic resin | 450 |
| A solvent | 225 |

The pigment material in the formulation which colors the formulation and provides it with corrosion inhibiting properties is zinc chromate or strontium chromate. The extender material, which is a filler and provides some tooth for adhesion for subsequent topcoat applications, is natural fibrous magnesium silicate or a porous low micron particle size silica-magnesium oxide material having a Hegeman fineness of 6½ to 7 and a loose bulk density of 9.63 pounds per cubic foot. The first acrylic resin in the formulation, which facilitates adhesion of the primer to metal and to topcoat applications, is a copolymer of 50 percent methyl methacrylate and 50 percent ethyl acrylate having a viscosity in a 40 percent solution of toluene of 480 to 640 centipoises at 30° C. The second acrylic resin in the formulation, which also facilitates adhesion of the primer to the metal surface and the topcoat, is a copolymer of 75 percent methyl methacrylate and 25 percent methyl acrylate having a viscosity in a 40 percent solution of toluene of 855 to 1,700 centipoises at 30° C. The solvent in the formulation is toluene.

In the preparation of the formulation, the pigment material, the extender material and the two acrylic resins are placed in a pebble mill and ground for 48 hours at room temperature. The mix is then separated from component coarse materials with a suitable strainer and mixed with the toluene solvent. The inert nature of the mix allows its prolonged storage prior to application to the surface to be protected without adverse effect.

The following specific examples are intended to illustrate the invention but not limit it in any way:

EXAMPLE I 300 grams of strontium chromate, 300 grams of natural fibrous magnesium silicate, 1,050 grams of the above described first copolymer of methyl methacrylate and ethyl acrylate and 450 grams of the above described second copolymer of methyl methacrylate and methyl acrylate were ground in a pebble mill for 48 hours at room temperature. The resulting mix was then dissolved in 225 grams of toluene.

EXAMPLE II 300 grams of zincn chromate, 300 grams of natural fibrous magnesium silicate, 1,050 grams of the above described first copolymer of methyl methacrylate and ethyl acrylate and 450 grams of the above described second copolymer of methyl methacrylate and methyl acrylate were ground in a pebble mill for 48 hours at room temperature. The resulting mix was then dissolved in 225 grams of toluene.

EXAMPLE III 300 grams of strontium chromate, 300 grams of the above described porous silica-magnesium oxide, 1,050 grams of the above described first copolymer of methyl methacrylate and ethyl acrylate and 450 grams of the above described second copolymer of methyl methacrylate and methyl acrylate were ground in a pebble mill for 48 hours at room temperature. The resulting mix was then dissolved in 225 grams of toluene.

EXAMPLE IV 300 grams of zinc chromate, 300 grams of the above described porous silica-magnesium oxide, 1,050 grams of the above described first copolymer of methyl methacrylate and ethyl acrylate and 450 grams of the above described second copolymer of methyl methacrylate and methyl acrylate were ground in a pebble mill for 48 hours at room temperature. The resulting mix was then dissolved in 225 grams of toluene.

a plurality of aluminum and treated cadmium plated steel test panels were treated with the various above described primer formulations and allowed to dry. Conventional acrylic topcoats were then applied to each panel. Various conventional diester oil resistant and adhesion tests including wet tape tests, dry knife and knife recovery tests were performed on these panels as well as on other panels coated with conventional two package epoxy type primer formulations and similar topcoat formulations. Results of these tests showed that the primer formulations of Examples I – IV were at least equivalent in all characteristics and properties to the conventional two package epoxy formulations.

Obviously, many modifications and variations of the present invention are possible in the light of the above teachings. It is therefore to be understood that within the scope of the appended claims, the invention may be practiced otherwise than as specifically described.

What is claimed is:

1. A one package primer coating composition comprising:
   a. 300 parts by weight of a corrosion inhibiting pigment selected from a group consisting of zinc chromate and strontium chromate;
   b. 300 parts by weight of a magnesium silicous extender selected from a group consisting of natural fibrous magnesium silicate and porous silica-magnesium oxide having a Hegeman fineness of 6½ to 7 and a loose bulk density of 9.63 pounds per cubic foot;
   c. 1,050 parts by weight of a copolymer of 50 percent methyl methacrylate and 50 percent ethyl acrylate having a viscosity in a 40 percent solution of toluene of 480 to 640 centipoises at 30° C.;
   d. 450 parts by weight of a copolymer of 75 percent methyl methacrylate and 25 percent methyl acrylate having a viscosity in a 40 percent solution of toluene of 855 to 1,700 centipoises at 30° C.;
   e. and 225 parts by weight of toluene.

2. The coating composition substantially as described in claim 1 wherein the corrosion inhibiting pigment is zinc chromate.

3. The coating composition substantially as described in claim 1 wherein the corrosion inhibiting pigment is strontium chromate.

4. The coating composition substantially as described in claim 1 wherein the magnesium silicous extender is natural fibrous magnesium silicate.

5. The coating composition substantially as described in claim 1 wherein the magnesium silicous extender is porous silica and magnesium oxide having a Hegeman fineness of 6½ to 7 and a loose bulk density of 9.63 pounds per cubic foot.

* * * * *